June 1, 1943.  H. ERNST ET AL  2,320,353
POWER TRANSMISSION MECHANISM
Filed Aug. 4, 1941  2 Sheets-Sheet 1

INVENTOR.
HANS ERNST
MARIO E. MARTELLOTTI
BY
ATTORNEY.

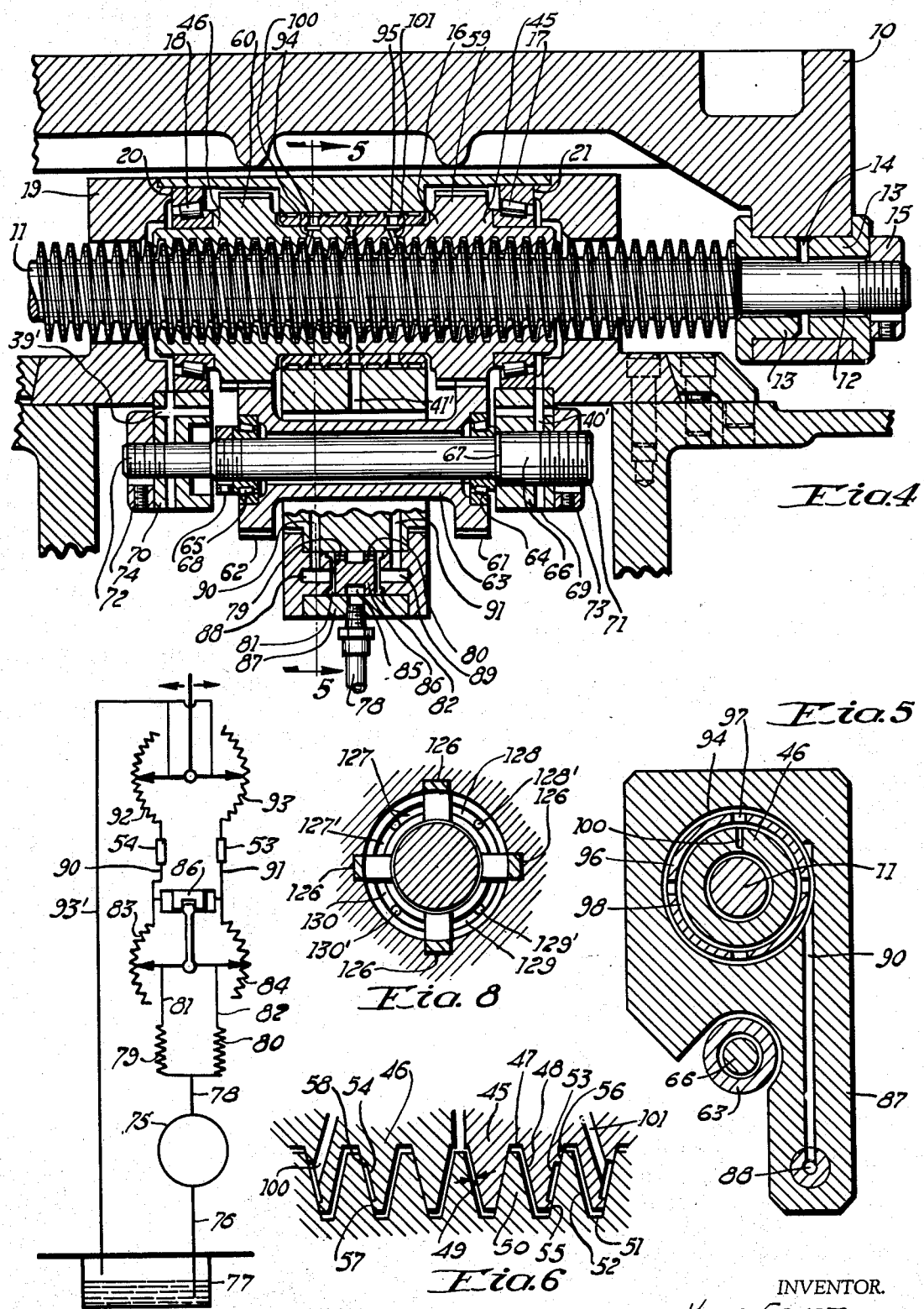

Patented June 1, 1943

2,320,353

UNITED STATES PATENT OFFICE 2,320,353

POWER TRANSMISSION MECHANISM

Hans Ernst and Mario E. Martellotti, Cincinnati, Ohio, assignors to The Cincinnati Milling Machine Co., Cincinnati, Ohio, a corporation of Ohio Application August 4, 1941, Serial No. 405,354

17 Claims. (Cl. 74—424.8)

This invention relates to machine tool transmissions and more particularly to a final actuating mechanism of such transmissions. It is customary in the powering of machine tools to connect the prime mover to the part to be actuated by an intervening transmission which is adjustable in various ways to obtain control of the final part as respects rate, direction, starting and stopping.

The transmission is actually connected to the part to be moved by a final actuating mechanism, which mechanism may take different forms. For heavy loads and linear motion at low velocities it is common practice to use a screw or nut because a suitable reaction is thereby provided for loads of large magnitude.

It is well known as a matter of practice that it is difficult to machine perfect interfitting threads on a screw and nut, and, even if this were possible, ordinarily wear would soon take place and nullify such efforts. It is essential in precision machines, however, that there be no play in the final actuating mechanism and in prior attempts to gain this object, resort has been had to artificial means to force the interfitting threads together, thus further increasing the inherent large frictional resistance between the relatively moving thread surfaces to such extent that a considerable amount of the power of the machine is utilized in overcoming the friction between these parts and manual operation is difficult.

Such tight interfitting of the parts also made it difficult to obtain adequate lubrication with the present types of lubricating systems because the tightness of the fit prevented lubricant from being injected between the surfaces, and whatever lubricant did get between the surfaces was soon squeezed out; thus, increasing the tightness of the fit without correspondingly improving the lubrication of the parts has resulted in a condition whereby an unnecessarily large percentage of the power of the machine is wasted in overcoming this condition.

This invention relates to an improved final actuating mechanism for coupling a transmission for movement of a support which has a very low frictional characteristic, thus greatly improving the efficiency of the machine.

Another object of this invention is to provide a mechanism of the character described which has a sufficiently low frictional characteristic to facilitate manual operation easily without any special adjustments being necessary.

A further object of this invention is to provide a screw and nut mechanism which is so designed that it may be kept adequately lubricated.

An additional object of this invention is to provide a screw and nut mechanism in which the parts are hydraulically restrained against relative axial movement and which will automatically compensate for any irregularities in the original formation of the parts or for subsequent wear of the interfitting surfaces.

Other objects and advantages of the present invention should be readily apparent by reference to the following specification, considered in conjunction with the accompanying drawings forming a part thereof and it is to be understood that any modifications may be made in the exact structural details there shown and described, within the scope of the appended claims, without departing from or exceeding the spirit of the invention.

Referring to the drawings in which like reference numerals indicate like or similar parts:

Figure 4 is a sectional view showing still another form of the invention.

Figure 5 is a section on the line 5—5 of Figure 4.

Figure 6 is an enlarged detail view of the thread form shown in Figure 4.

Figure 7 is a diagrammatic view of the hydraulic connections to the form of the invention shown in Figure 4.

Figure 8 is a cross sectional view showing a modified form of the invention.

Figure 1:
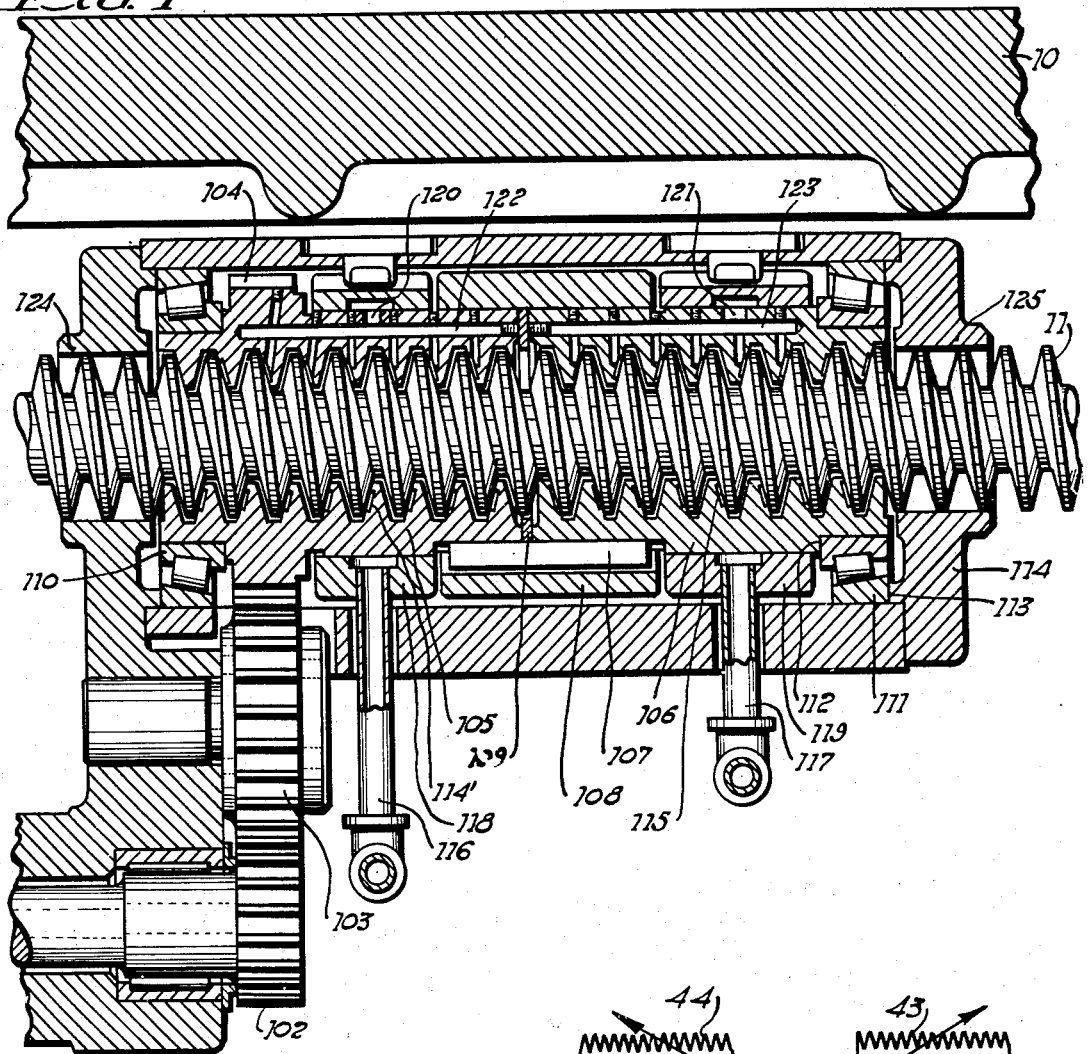
Figure 1 is a sectional view showing one form of the invention.

In the drawings the reference numeral 10 indicates a support which is to be moved against a variable resisting force such as that produced by a cutting tool or other material working implement. A screw 11 forming part of the final actuating mechanism constituting this invention by which a power transmission is coupled to the support 10 has a reduced portion 12 which is fitted in shouldered bushings 13 mounted in a bore 14 formed in the end of the support, and a nut 15 is threaded on the end of the screw for fastening the screw rigidly with the support. The connection at the other end of the screw to the support may be of similar construction. In this form of the invention the screw does not rotate while being moved bodily with the support 10.

Longitudinal motion is imparted to the screw by rotating a co-acting nut assembly, indicated generally by the reference numeral 16, which is anti-frictionally supported at each end by the anti-friction thrust bearings 17 and 18 which are mounted in the fixed support 19 of the machine. It will be noted that these bearings are in abutting relation at 20 and 21 with the fixed part of the machine so that all play is taken out of these bearings. In addition, such an arrangement makes it possible that any axial thrust on the screw is transmitted through the nut to the fixed support of the machine and not back to the transmission elements.

In accordance with this invention the thread of the screw and the thread of the nut are modified in various ways in accordance with the various forms of this invention to provide not a tight fit but a slight clearance space between the co-acting thread faces so that a fluid anti-friction medium may be injected between the thread faces and applied so as to create sufficient pressure to act as a motion transmitting means between the rotating driving thread and the stationary driven thread and without metal to metal contact, thereby eliminating the high frictional component which in the past required so much power to overcome. Furthermore, the fluid film thus created between the faces of the threads is under sufficient pressure to exert simultaneously axial thrusts on the screw in opposite directions so as to create equal and opposite forces which hydraulically lock the parts against relative movement. Thus, regardless of how high the pressure may go which is equivalent in prior art devices to tightness of fit, the friction does not rise in proportion and therefore the power requirement does not change materially for the same load and since the friction is kept low manual operation is always possible and easy without special adjustments.

Figure 3:
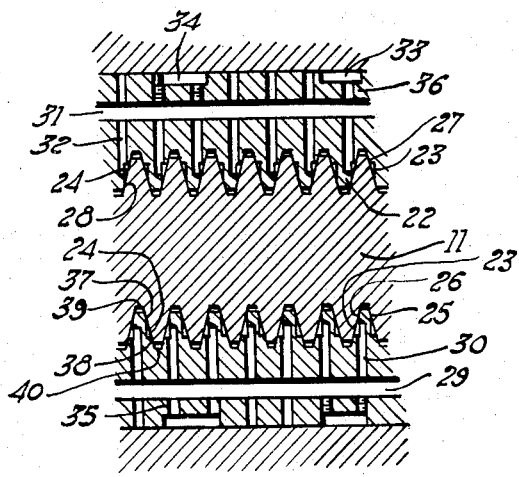
Figure 3 is a sectional view showing another form of the invention.

In the form of the invention shown in Figure 3 the nut thread 22 is relieved or cut away on opposite sides to provide a groove 23 in one face and a separate independent groove 24 in the other face. In order to avoid confusion one side face 25 of the nut thread will be referred to as the advancing side, and the other face 26 will be referred to as the retracting side. Attention is invited to the fact that the groove 23 does not extend to the end of the nut but stops short of each end so that the groove is in effect a closed helical groove. The same is true with respect to the groove 24, and since the grooves are on opposite sides of the thread it will be apparent that they do not intersect in any way and are separate and independent grooves. Since the nut is axially stationary, it will be apparent that fluid pressure in the groove 23 will act on the corresponding face 27 of the screw thread to effect advance of the screw and that another source of fluid pressure in the groove 24 will act on the other face 28 of the screw thread to effect a retraction of the screw. If the pressure areas of these two grooves are made equal and the unit of pressure in each groove is the same, opposed forces will act on the screw which, as hereinafter described, are arranged to counteract each other and hold the screw against relative movement with respect to the nut.

For the purpose of supplying fluid pressure to the groove 23 a longitudinal bore 29 is formed in the nut from which radiate a series of radial bores 30 which intersect the groove 23 in the manner shown. The groove 24 is supplied with pressure from a second longitudinal bore 31 formed in the nut from which radiate a second series of radial bores 32. The periphery of the nut is provided with two annular grooves 33 and 34, the groove 34 being interconnected with the longitudinal bore 29 by radial bore 35, and the groove 33 being connected to the bore 31 by the radial bore 36.

Figure 2:
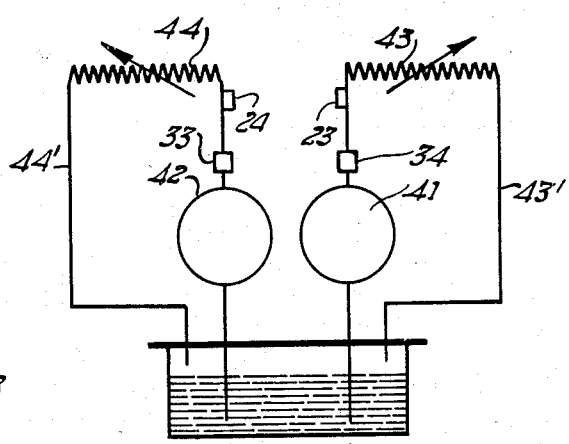
Figure 2 is a diagram of the hydraulic connections to the mechanism shown in Figure 1.

The pressure grooves 33 and 34 may be connected to independent pumps in the manner shown in the hydraulic diagram in Figure 2. This means that when the groove 24 is supplied with fluid, the areas 37 and 38 resist the free flow of fluid from the groove and therefore the pressure in the groove increases until a stabilized condition is reached in which the pressure in the groove bears a definite relation to the quantity of flow and the value of the resistance. If the quantity of flow and the resistance to outflow from the groove 24 remain constant, the pressure will be a constant and have a definite value There must be a continuous flow through the system to maintain this condition. This means that there is a continuously flowing film through the areas 37 and 38 which film has a gradient pressure ranging from the relatively high pressure in the groove to the atmospheric pressure at the exhaust. The same condition exists with respect to the groove 23.

The fluid passing through these resistances collects in the grooves 39 and 40 which are the roots of the threads and therefore open at the end, whereby the fluid is free to escape and return to reservoir as through return passages which in Figure 4 are indicated by the reference numerals 39', 40' and 41'.

It should now be apparent that on one side of a screw thread there is a pressure urging the thread in one direction, and on the opposite side there is another pressure urging the thread in the opposite direction whereby the thread will take up a position in which these pressures are balanced. In so doing, the thread has determined the values of the resistances to outflow because that is what determines the pressure. Since a lubricant film now exists between each side of the screw thread and the nut, it will be apparent that the screw thread is held balanced between sides of the nut thread and out of metal to metal contact therewith.

Should the screw shift due to the application of a load, it would increase one of the resistances and decrease the other, thereby increasing the pressure on one side of the screw thread and decreasing the pressure on the other side which would produce a reaction sufficient to oppose the load. In this manner automatic control is obtained.

The diagram in Figure 2 shows in simplified form the method of hydraulic control and it will be noted that the pressure grooves 23 and 24 are independently supplied with fluid pressure by pumps 41 and 42. The reference numerals 43 and 44 indicate respectively the variable resistances which control the escape of fluid from these grooves while the numerals 43' and 44' indicate the return channels and it will be obvious that when the value of these resistances is high the pressure in the grooves will be high and vice versa. It should be noted that these resistances vary inversely, that is, when the resistance 43 increases, the value of the resistance 44 decreases, with the result that whenever the pressure in one groove rises the pressure in the other groove drops which results in a large differentiation of pressure for a given motion and thus a quick reaction to counteract a disturbing force causing relative axial shifting between the screw and nut.

The use of separate pumps prevents the possibility of kickback from one groove to the other without necessity of employment of balancing valves or like pressure and flow control devices. It should now be evident that a pump delivery volume can be chosen in accordance with the normal value of the resistance 43 to produce any desirable unit pressure in the groove 23 which will satisfy normal operating conditions of the machine and any rise in the load will produce a compensating effect upon the resistance 43 to increase the pressure in the groove 23 so that the pressure in the groove will be adequately raised to maintain the oil film under the new conditions.

The construction shown in Figure 3 is not susceptible of adjustment as respects the values of the resistances for the reason that these resistances are determined by the total clearance provided in one thread space, but relative pressure effects can be controlled by varying the fluid supply.

A more convenient form of the invention is shown in Figure 4 in which initial relative adjustment of the resistances is accomplished by dividing. Each portion has the desired form of thread produced in it with the grooves 53 and 54 arranged as shown in Figure 6.

The shape of thread in screw and nut is made such as to provide the desired clearance spaces 47, 48, 49, 51 and 52 to permit a free escape of the oil.

After the parts have been assembled, as shown in Figure 4, the nut portions are adjusted relative to the screw to provide the desired values for the resistances and when this adjustment has been made the two nut portions are connected together whereby they will thereafter rotate as a unit.

In other words, the nut portion 45 is provided with a helical groove 53 on the one face of the thread while the nut 46 is provided with a helical groove 54 formed in what would be the opposite face of the nut thread if the two nuts were integral. The grooves 53 and 54 are, of course, closed grooves in the sense that they terminate short of the ends of the nut thread as shown in Figure 6. The marginal areas 55 and 56 on the opposite sides of the groove 53 constitute the resistance areas for the groove 53 while the marginal surfaces 57 and 58 constitute the resistance areas for the groove 54.

Variable adjustment of the values of these resistances may be obtained by providing a construction in which the nut portions 45 and 46 are provided with spiral gears 59 and 60 which intermesh with spiral driving gears 61 and 62. The gear pair 59—61 has an opposite helical angle to the gear pair 60—62. The spiral gears 61 and 62 are connected together by the integral hub 63. Since the helical angles are opposite, it should be apparent that if the gear pair 61—62 is shifted axially without rotation that the gears 59 and 60 will be rotated in opposite directions. This can be done in such a manner that the face of the nut thread 46 containing the groove 54 is moved into tight engagement with one face of the thread of the screw and the face of the nut thread 45 containing the groove 53 may be forced into tight engagement with the opposite face of the thread of the screw.

Now, by shifting the spiral gears in the opposite direction each nut may be backed off or, in other words, moved toward one another as viewed in Figure 6 to simultaneously determine the clearance space desired in the various resistance areas and thus determine the value of the hydraulic outflow resistance for the grooves 53 and 54. This method of adjustment is accomplished by supporting the gears 61 and 62 on anti-friction bearings 64 and 65 on a shaft 66 and clamping the bearings between a shoulder 67 on the shaft, and a nut 68 threaded on the other end of the shaft. This holds the gears and the shaft together for simultaneous axial adjustment without interfering with the rotation of the gears. The opposite outer ends of the shaft are supported in depending brackets 69 and 70 and each end of the shaft is threaded at 71 and 72 and provided with lock nuts 73 and 74 so that by releasing one lock nut and tightening the other the axial position of the shaft may be changed. In so doing, the axial position of the gears 61 and 62 is changed and this produces relative rotation between the spiral gears 59 and 60.

It should thus be apparent that it is now immaterial whether the clearance space is cut exactly to dimension or not because now face to face contact is established, first between the grooved faces and then they are backed off to provide any desirable clearance, which clearance determines the hydraulic resistance to the escape of fluid from the grooves. After the necessary adjustment is made the lock nuts 73 and 74 are tightened to prevent any subsequent axial movement between the helical gear pairs.

Figure 7 is a hydraulic diagram showing the manner in which a single pump may be utilized to supply fluid to the grooves 53 and 54 without the danger of kickback from one groove to the other should the pressure in one groove vary with respect to the pressure in the other groove.

A single pump 75 having an intake 76 through which fluid is withdrawn from the reservoir 77 has its delivery 78 connected in parallel to two equal resistances 79 and 80 which serve to divide the output of the pump. These resistances are connected by channel means 81 and 82 to variable resistances 83 and 84. One form of such an arrangement is shown in Figure 4 in which the pump delivery 78 is connected to an annular groove 85 in a shiftable member 86. The two longitudinal bores constitute the fixed resistances 79 and 80. The fluid discharged through these bores passes into spaces which correspond to the channels 81 and 82.

The depending support 87 which encloses the member 86 has a pair of axial bores 88 and 89 and the member 86 is of sufficient length to restrict the flow from the spaces 81 and 82 into these bores and it thus acts to create variable hydraulic resistances at the orifice of these bores and is responsive to the pressures therein whereby when the pressures are equal the member 86 is equally spaced from the orifice of each bore.

Should increased resistance cause a pressure rise in one of these bores the member 86 will be shifted to restrict the flow to the other bore having the higher pressure. The fluid then passes through channels 90 and 91 to the pressure grooves 53 and 54. In the hydraulic diagram in Figure 7 the variable hydraulic resistances indicated at 92 and 93 indicate the resistance to the escape of fluid from the pressure grooves, which escaped fluid finally combines in the root of the screw thread and escapes to reservoir, through return indicated generally by the numeral 93'.

The manner in which the channels 90 and 91 convey the fluid to the coacting threads is shown in Figure 5 in which it will be seen that the channels intersect tangentially annular grooves 94 and 95 formed in a sleeve 96, the sleeve being fixed in the housing 87. A series of radial holes 97 establish communication between the grooves 94 and 95 and a second pair of annular grooves 98 and 99 formed in the periphery of the nut portions 46 and 45. The nut portions have bores 100 and 101 which connect grooves 98 and 99 to the pressure grooves 54 and 53.

In Figure 1 of the drawings there is shown another modification of the invention and illustrating more particularly another method for obtaining relative adjustment between the two nut portions which is particularly suitable when a spur gear drive is utilized. The reference numeral 102 indicates the final drive gear from the transmission, and reference numeral 103 indicates an idler gear by which the gear 102 is connected to a spur gear 104 which is formed on the periphery of the nut portion 105. The other nut portion 106 is connected to the first by means of a key 107 mounted in an aligning sleeve 108. In this case a washer 109 is interposed between the ends of the nut portions and this washer is ground to the necessary thickness required for the spacing of the nut portion 106 from the portion 105. The gear 104 abuts against the thrust bearing 110 which has a fixed position while the thrust bearing 111 is interposed between a shoulder 112 on the nut portion 105 and the face 113 of a removable end plate 114. As this plate is drawn into position it forces the nut portion 106 against the washer 109 which, in turn, forces the nut portion 105 against the thrust bearing 110 whereby all the parts are tightly clamped together.

Fluid pressure may be supplied to the annular grooves 114' and 115 in the respective nut portions in accordance with the hydraulic diagram in Figure 2 in which separate supply pipes 116 and 117 are connected to nonrotatable sleeves 118 and 119 forming a constant connection to the radial holes 120 and 121 formed in the nut portions 105 and 106.

It will be noted that these bores communicate with longitudinal bores 122 and 123 and that each longitudinal bore has a series of radial bores communicating with the spiral groove at various points. The advantage of this is that direct supply is afforded the groove at various points so that there will be no starvation of fluid or drop in pressure in the helical groove which might occur if only one connection was made to the groove.

It will be noted that throughout the explanation of this invention the aim has been to prevent any metal to metal contact between the lead screw and the driving nut and that fluid pressure has been provided for preventing metal to metal contact in a longitudinal direction and although this pressure does have a small radial component it is not sufficient to prevent sag of the lead screw when the lead screw is comparatively long. It is, therefore, proposed that fixed sleeves, such as indicated by the reference numerals 124 and 125, be provided in each end of the housing having a slight clearance relative to the screw, but which will act to centralize the screw relative to the axis of the nut and thus prevent any sag which might be so great that it will produce harmful results.

Attention is invited to the fact that the pressure grooves have been considered as a single helical groove for simplicity of description but it is to be understood that what has been considered as one groove may be divided up or interrupted by stoppers 126 in Figure 8 to provide a series of quadrant grooves 127, 128, 129 and 130 which when supplied independently with pressure by interdrilled passages of the type shown in Figure 3 and terminating in orifices 127', 128', 129' and 130' will all produce a reaction in the same axial direction and thus act collectively. It should be obvious that there would be another set of four quadrant grooves opposing these, thereby necessitating altogether eight annular grooves of the type 133 to provide independent supply to all.

There has thus been provided an improved means for connecting a transmission to a final support in a manner to materially reduce the driving friction, so much so that manual operation is always possible, and easy, and in which the final screw and nut are hydraulically locked against relative movement at all times, thus insuring the positive positioning of the support driven thereby at all times.

It is to be noted that there has been provided an improved machine tool power transmission mechanism particularly adaptable for use in connection with milling machines or like tools embodying a pair of supporting elements translatable one with respect to the other which is equally efficacious whether the tooling component on a work piece carried by one of the supports is in the direction of translation or in opposition to the direction of translation. This is inherent in the feature of provision of oppositely acting hydraulic pressure means insuring provision of a yielding lubricant cushion intervening the interengaged teeth of the driving and driven members in both directions of potential engagement. The basic principles here involved are equally effective whether the driving transmission be a complete nut screw mechanism as indicated in its entirety in Figure 1 of the drawings or a rack, angularly slidable wedge device or other mechanism presenting a characteristic cross sectional appearance corresponding to the fragmentary section, Figure 6, in which the interdental or interlocking tooth arrangement is shown with pressure areas in part effective in the one and part effective in the other or opposite direction of potential relative interengagement of the parts, being in all instances effective to insure pressure resistance to metal to metal interengagement of the parts coupled with constant creation and maintenance of an intervening lubricant film.

It is further to be understood that due to the independent control mechanisms either by valving or alternatively by employment of independent pressure devices that the present invention has the inherent capacity for creation of either normal balanced pressure conditions at opposite faces of the tooth elements, insuring substantial relative centralization of the parts or alternatively of production of any desired unbalanced pressure condition. This is particularly advantageous in the case of milling machine transmissions or the like in that for a known constant direction of effectiveness of the tooling force, such as the rotational movement of the milling cutter, an unbalanced pressure condition may be created in which the higher pressure will be constantly effective in a direction opposing this tooling force, minimizing the tendency of relative movement of the interengaged teeth when changing from idle to load conditions and insuring a higher effective pressure with consequent greater safety factor in oil film maintenance at the loaded side.

Attention is further invited to the fact in this connection that most efficient operation of the mechanism in question is attained when the interfitting toothed elements are so constructed and arranged as to permit of potential slight relative longitudinal or axial movement so that initial relative positioning may be preselected by determination of the effective opposed pressures under idling conditions for the relative spacings at opposite sides, which pressures will be inversely varied upon application of load in one direction or another in a manner to build up a high resistance to relative movement upon application of the load, damping out and eliminating back lash effects.

This damping out action, it will be understood, is accentuated by the continuous supply of pressure fluid to the opposed pressure areas at pressures in excess of those produced by the machining load through escape resistances of such high value that quick extrusion of the entrapped pressure fluid upon directional change of load is reduced to a minimum.

What is claimed is:

1. In a screw and nut combination of the class described, the combination with a lead screw, of a nut telescoping said lead screw and having lubricant receiving pockets formed in the thread faces thereof, and means to supply said pockets with lubricant under pressure to effect extrusion of the lubricant between opposed thread faces.

2. In a screw and nut combination of the class described, the combination with a lead screw, of a rotatable nut mounted on said screw and having a helical groove formed in the face of the thread thereof, and means to maintain said groove supplied with lubricant under pressure during rotation of the nut to effect extrusion of the lubricant between the opposed thread faces of the screw and nut.

3. In a screw and nut combination, one of which is rotatable to effect actuation of the other, the combination of a helical groove formed in each face of the nut thread, and means to supply each groove independently with lubricant under pressure to effect extrusion of the lubricant between each set of opposed thread faces to hydraulically lock the parts against relative axial movement.

4. In an actuating mechanism comprising a screw and nut one of which is adapted to be power driven to effect actuation of the other, the combination of a thread on said nut having a helical groove formed in each side face thereof, said grooves being substantially closed by the opposing threads of the screw, and separate pumps for supplying each groove with lubricant under pressure to effect extrusion of the lubricant between the opposed faces adjacent thereto whereby the parts will be axially balanced against relative movement.

5. In an actuating mechanism, the combination of intermeshing threaded members one of which constitutes a driving means and the other a driven means, said driving means having thread faces in which spiral grooves are formed and said driven means having thread faces substantially closing said grooves and thereby restricting the escape of fluid therefrom, a source of pressure, and independently restricted channels for supplying said grooves with fluid under pressure from said source to effect extrusion of the lubricant between the opposed thread faces to effect lubrication thereof and maintain said members against relative axial movement during power actuation thereof.

6. In an actuating mechanism of the class described, the combination of intermeshing threaded members one of which constitutes a driving means and the other a driven means, one of said threaded members having lubricant receiving pockets formed in the thread faces thereof and substantially closed by the thread faces of the other member to control the escape of lubricant from said pockets, means to supply said pockets with lubricant under pressure to effect extrusion of the lubricant between said faces and thereby create a load carrying film therebetween, and means to inversely vary the flow of lubricant to said pockets in accordance with variation in load upon said film.

7. In an actuating mechanism comprising intermeshing threaded members adapted for relative movement whereby one member may drive the other, the combination of a thread on one of said members having a pressure lubricant receiving pocket formed in one face whereby pressure in said pocket will effect an axial urge on the other member, and a second pressure lubricant receiving pocket formed in the other face of said thread to effect an axial urge on the other member in opposed relation to the first-named urge to balance the members against relative axial movement during actuation thereof.

8. In a screw and nut combination having intermeshing threads, the combination of separate pressure lubricant means interposed between the threads for effecting opposite directions of axial urge upon the screw to hold it balanced against relative movement in either direction with respect to the nut, and means responsive to any relative axial movement caused by an overload for inversely changing said pressures to produce a component which will balance said overload.

9. In an actuating mechanism comprising intermeshing threaded members, one of which is a lead screw, the other driving means for effecting axial shifting of said screw, said driving means comprising a pair of nut members each having an oil receiving pocket formed in a thread face thereof but on opposite sides of a common thread, means to adjust said nut members axially relative to each other and relative to said screw for independently adjusting the clearance space between the pocketed faces and the plane surfaces of the screw thread, said clearance spaces acting as resistances to control the pressure in said pockets, and means to interconnect said nut members for actuation as a unit after axial adjustment has been completed.

10. In an actuating mechanism comprising intermeshing threaded members including a lead screw and a pair of telescoping threaded members, means to drive said pair of members to effect axial shifting of the screw, said pair of members each having an oil receiving pocket formed in a thread face thereof but on opposite sides as respects a common thread, independently restricted channels for supplying each pocket with oil under pressure, means to relatively adjust said pair of threaded members axially relative to each other and relative to said screw for independently adjusting the resistance to escape of oil from said pockets whereby the pressure in each pocket may be made the same, and means to key said pair of members together for rotation as a unit after adjustment has been effected.

11. In an actuating mechanism of the class described, the combination of a support having an axial bore therein, threaded means rotatably mounted in said bore, a lead screw passing through said threaded means and operatively connected for moving a part, said threaded means being power operable to effect axial shifting of said screw, a lubricant pressure supply means connected for maintaining a pressure oil film between the opposing thread faces whereby the surfaces are held out of metal to metal contact, and tubular means carried by said support member and surrounding said screw in close fitting relation thereto to prevent sagging of the screw as it passes through said driving means.

12. A power drive transmission mechanism including a pair of elements having interengaged tooth portions, power means for effecting relative movement of said tooth portions to produce translation of one of said elements, means providing oppositely effective pressure areas intervening certain of the interengaged faces of the toothed elements, and means for creating prescribed opposing pressures within said areas, oppositely restraining the interfitting teeth elements against metal to metal contact whereby a pressure lubricant film is maintained between their opposed interengaged faces.

13. A power drive mechanism of the character described including an externally threaded screw member and an internally threaded nut member arranged in interfitting relation with the screw member whereby said members provide opposed helically disposed faces adapted to effect axial relative translation upon rotation of one of the members, at least one of said members having a pressure recess formed in the helical face thereof, and means for forcing a lubricant medium under pressure between the opposed faces of the members by means of said recess to prevent metal to metal contact of the members during operation and insure maintenance of an adequate lubricant film intervening said opposed faces as an entirety.

14. In a power drive mechanism of the character described, the combination with an externally threaded driving means and intermeshing internally threaded means adapted to be driven thereby, of means for impounding fluid under pressure between the opposed sides of said threaded means utilized for driving in one direction, and additional means for impounding fluid under pressure between the opposed sides of said threaded means utilized for driving in the other direction to form an antifriction motion transmitting medium between the driving and driven means without physical contact between them.

15. In a power drive mechanism of the character described, the combination of operatively connected nut and screw means whereby one may drive the other, the threads of said nut and screw means being modified to provide clearances between thread faces, means to impound a body of fluid under pressure between one set of faces, other means to impound a body of fluid between the other set of faces, fluid supply means for replenishing said bodies of fluid, said clearances being dimensioned to serve as resistance throttling means to control the escape of fluid from said bodies and thereby determine a pressure in the impounded bodies to maintain said clearance under normal loads and which will act to correspondingly change said pressures under abnormal loads to check any dimensional change of said clearances in its incipiency.

16. In a power driving mechanism of the screw and nut type in which rotation of the nut will effect bodily movement of the screw and in which a predetermined amount of lost motion exists between the faces of the intermeshing threads, the combination of means for impounding fluid under pressure between the faces of the threads including a supply source, and a resistance control formed by said lost motion for determining a pressure in the impounded fluid which will prevent said lost motion from being taken up during actuation of the mechanism.

17. In a power drive transmission, the combination of a threaded driving means and a threaded driven means, means to impound a body of fluid between the advance effecting faces of the threads, means to impound another body of fluid between the retraction effecting faces of the threads, and means to supply fluid to said bodies at a sufficient rate to maintain pressures which will provide a non-yielding antifriction motion transmitting means between the respective sets of faces, said pressures being ultimately determined by the leakage resistance of the interspace between the faces of the corresponding pairs of thread faces.

HANS ERNST.
MARIO E. MARTELLOTTI.